Patented Nov. 11, 1947

2,430,479

UNITED STATES PATENT OFFICE 2,430,479

BONDING OF LAMINATES BY MEANS OF ISOCYANATES

Burt Carlton Pratt and Henry Shirley Rothrock, Wilmington, Del., assignors to E. I. du Pont de Nemours & Company, Wilmington, Del., a corporation of Delaware No Drawing. Application July 23, 1941, Serial No. 403,766

14 Claims. (Cl. 154—140)

This invention relates to a process for combining a plurality of different polymeric materials.

It is at times desirable to modify a polymeric material by combining therewith a second polymeric material either in apparently homogeneous admixture or in appreciably heterogeneous relation. An example of the first class is the admixture of resins with cellulose derivatives in coating compositions. An example of the second class is the coating of regenerated cellulose film with a moistureproofing coating. The polymeric materials are combined in an effort to alter advantageously the properties of at least one, e. g., the durability, moisture resistance, etc. or for purposes of economy. In many instances this combining of the two different polymeric materials has been unsatisfactory because of inadequate bonding of the two different polymeric materials.

This invention has as an object an improvement in the bond between two different polymeric materials. A further object is improved adhesion of one polymeric material to another. Another object is a new material containing a polymeric material combined with at least one other different polymeric material.

These objects are accomplished by the following invention wherein an organic compound having a plurality of —X═C═Y groups, wherein X is —C or N and Y is O, S, or NR wherein R is hydrogen or a monovalent hydrocarbon radical, is reacted with two or more different separately obtained polymeric materials reactive with —X═C═Y groups, i. e., containing active hydrogen as determined by the Zerewitinoff method. (Zerewitinoff, Ber., 40, 2023 (1907); Ber., 41, 2236 (1908); Kohler, J. Am. Chem. Soc., 49, 3181 (1927).)

A preferred subgenus of this invention is that wherein the active hydrogen containing, separately obtained, polymeric materials are reacted with a compound having a plurality of —N═C═Z groups, wherein Z is a chalcogen (J. Am. Chem. Soc., 63, 892 (1941)) of atomic weight less than 33. This subgenus includes the polyisocyanates, the polyisothiocyanates and mixed isocyanate-isothiocyanates having at least one of each of these groups. For convenience of disclosure, the invention will be discussed below largely in terms of the polyisocyanates.

The bond established between the polyisocyanate and a polymeric material having hydroxyl groups is probably thru a urethane linkage. The bond with a polymer having hydrogen bearing amino groups is probably a urea linkage. The bond with a polymer having carboxyl groups is probably an amide linkage. When the polyisocyanate is reacted with a plurality of polymeric materials containing active hydrogen, as in the process of the present application, the reaction is probably complex and depends upon the relative reactivity of the hydrogens in the polymers. To what extent the improvement in properties is due to chemical bonding (cross-linking) of different polymers and to what extent it is due to physical forces is not known.

Because of the large number of applications to which the reaction between a diisocyanate and two different polymeric materials, each containing active hydrogen as determined by the Zerewitinoff method, may be put, the method of carrying out the reaction can be varied widely. In one method of carrying out the process of this invention, the surface of one of the polymeric materials is coated or sprayed with a solution of, for example, hexamethylene diisocyanate in dry toluene, and the solvent allowed to flash off after which the other polymeric material is placed on this surface and the two are then heated together under pressure. Under these conditions a firm bond is formed due apparently to reaction of the isocyanate groups with both polymeric materials. In some cases it is desirable to incorporate the diisocyanate in a solution of a polymeric material containing active hydrogen and then apply this solution to the surface of another polymeric material containing active hydrogen and heat the coated material to cause reaction or further reaction. In some instances it is desirable to intimately mix the two polymeric materials before reacting with the diisocyanate. Again in other instances, it is preferable first to react one of the polymeric materials partially with the poly—X═C═Y compound, then to apply this material to the surface of one of the materials to be united and then to place the other polymeric material on top of this after which the assembly is heated. This method is particularly satisfactory when one of the polymeric materials to be united with another polymeric material is already preformed. The method most suitable for any particular case is easily chosen by anyone skilled in the art.

The more detailed practice of the invention is illustrated by the following examples, wherein parts are given by weight. There are of course many forms of the invention other than these specific embodiments.

Example I

This example illustrates how an improved bond of a cellulosic yarn to natural rubber can be secured by employing a diisocyanate and an active-hydrogen containing rubber.

Two parts of trioxane-modified natural rubber was dissolved in 65 parts of toluene at room temperature with mechanical stirring. When the solution was homogeneous, after several hours of stirring, 33 parts of hexamethylene diisocyanate was poured into the solution. The solution was then placed in a shallow tank of convenient width and length and 1,100-denier, high-tenacity, regenerated cellulose yarn, produced in accordance with the process disclosed in Parker U. S. Patent 2,133,714, was led through the solution by means of suitable guides and then into a drying chamber maintained at 140° C. and provided with air circulation. The excess solution was permitted to drain back into the tank. The yarn did not come in contact with any support unitl it had travelled through the chamber a distance of approximately 5 feet wherein it was at least partially dried. Additional passes through the chamber were made by passing the yarn over suitable rollers. The yarn was drawn through the chamber mechanically at a speed of 15 ft./min. and wound on a bobbin. The increased weight of the yarn resulting from the above treatment amounted to 40% of the initial weight of the yarn. The yarn was then vulcanized to rubber and the strength of bond of yarn to rubber tested in the following manner.

The yarn or cord is first combined with the trioxane-modified rubber by means of the poly—X=C=Y compound. The modified cord is then laid on the surface of a thin coat of unvulcanized rubber calendered onto a cotton backing. The rubber and cord are then placed in a press and vulcanized at the temperature and pressure necessary to completely vulcanize the rubber. Shims are used which allow the overflow of a very small amount of rubber during vulcanization. During the vulcanization, the cords become embedded in the surface of the rubber. The bond of the cord to the rubber is measured individually on a Scott tension testing machine. In this test the cord is peeled from the rubber stock at a uniform rate and the bond strength read in terms of grams required to cause this separation.

As a basis of comparison the bond strength value of 100 was assigned to an unmodified regenerated cellulose cord, i. e., one which had not been treated with diisocyanate and trioxane-modified rubber, values higher than this indicating improved bond strength, and lower values indicating poorer bond strength. On this basis, cotton cords of similar size and construction gave bond strength value of 150. The bond strength value of the modified cord to rubber in this example was 420. Trioxane-modified rubber alone is of little value as a bonding agent for cellulose cord and rubber.

Example II

This example illustrates the bonding of an active-hydrogen containing neoprene to cellulosic yarn by means of diisocyanate and the bonding of the modified yarn to rubber.

An aldehyde-modified neoprene was prepared by reacting 100 parts neoprene (polymerized chloroprene) with 50 parts paraformaldehyde in 900 parts carbon tetrachloride solution in the presence of 10 parts zinc chloride and 90 parts acetic acid at 65–70° C. for 4 hours. The aldehyde-neoprene reaction product was isolated by coagulation with alcohol followed by washing with alcohol and milling to constant weight in an internal mixer.

Five parts of the aldehyde-neoprene was dissolved in 90 parts of toluene at room temperature with mechanical stirring. When the solution was homogeneous, 5 parts of hexamethylene diisocyanate was added. A high tenacity regenerated cellulose yarn was treated with this solution, dried, and wound as in Example I. This treated yarn was then vulcanized to rubber and tested for bond strength. The bond strength value of the modified yarn to rubber was about 560 as compared with 100 for the untreated yarn. The increased weight of the yarn was 17%.

Example III

This example illustrates the bonding of cellulose acetate to aldehyde-modified rubber by means of a diisocyanate and the utilization of this bonding to secure adhesion between cellulose acetate and rubber.

A rubber-coated fabric was sprayed with a solution containing 95 parts of toluene, 5 parts of aldehyde-modified rubber, prepared from trioxane and rubber by the general procedure referred to in Example I, and 5 parts of hexamethylene diisocyanate. A coat of plasticized cellulose acetate was then applied to this base and the product thus obtained baked for ½ hour at 150° C. Exceptionally good adhesion of the topcoat to the rubber was thus obtained. When the cellulose acetate coating was applied directly to the rubber, the adhesion was very poor. The material prepared employing the diisocyanate also exhibited much greater resistance to whiting on scrubbing.

Example IV

This example illustrates the bonding of alkyd resin to regenerated cellulose by means of a diisocyanate.

A transparent sheet of regenerated cellulose was coated with a composition consisting of 24 parts of drying oil modified alkyd resin having an acid number of 33, 1.4 parts hexamethylene diisocyanate, 0.4 part cobalt naphthenate drier, 0.01 part benzoyl peroxide, and 25 parts toluene. The coated sheet was then immediately placed in a 90° C. oven for 1¼ minutes. The coated sheet was clear and essentially tack free. It exhibited no whitening or loosening of the coating on soaking in water overnight.

Example V

This example illustrates the bonding of nitrocellulose to regenerated cellulose by means of an alkyd resin and a diisocyanate.

A solution of nine parts of a drying oil modified alkyd resin and one part of hexamethylene diisocyanate in 190 parts of toluene was coated on a regenerated cellulose sheet and topcoated with a moisture-proofing lacquer of the following composition: nitrocellulose 50, paraffin wax (M. P. 60° C.) 3, dammar (dewaxed) 7, dicyclohexyl phthalate 30, dibutyl phthalate 10, toluene 245, ethyl acetate 450, and ethyl alcohol 35. The sheet of regenerated cellulose was passed continuously through the bath of the aforementioned composition (top coating) maintained at 35° C., the excess coating material being then removed by scraping and the coated sheet dried (the volatile solvent removed) at a temperature above the melting point of the wax.

After 24 hours' immersion in water, this coating still adhered to the base sheet, whereas a similar sheet in which the alkyd resin sub-coat containing no diisocyanate showed complete loosening of the top coat. Also, the diisocyanate-treated sheet showed a heat-seal of 120 grams whereas the untreated sheet had a heat-seal of 80 grams (on coatings with an equal degree of thermal plasticity, heat seal bond strength is a direct measure of adhesion).

*Example VI*

This example illustrates the use of a diisocyanate in improving the adhesion of cellulose nitrate to cellulose.

A solution of 5 parts of decamethylene diisocyanate in 95 parts of toluene was applied to a sheet of regenerated cellulose. After removal of the toluene by evaporation, the diisocyanate-treated sheet was top-coated with the moisture-proofing lacquer described in Example V. The sheet was dried to remove lacquer solvent at a temperature above the melting point of the wax. The coated sheet thus obtained was not adversely affected by 24 hours' immersion in water, whereas a similar sheet coated with the nitrocellulose lacquer alone showed loosening of the coating in six hours' immersion in water.

*Example VII*

This example illustrates the bonding of nitrocellulose to regenerated cellulose employing polyvinyl butyral and a diisocyanate.

A solution of eight parts of polyvinyl butyral (10% free hydroxyl groups) and two parts of meta-phenylene diisocyanate in 90 parts of toluene was applied to regenerated cellulose film and the solvent removed by heating. A top coat of moisture-proofing lacquer was applied as in the preceding example. The coating was still intact after 24 hours' immersion in water, whereas a similar coating containing no diisocyanate was removed in less than 6 hours.

*Example VIII*

This example illustrates the bonding of partially hydrolyzed vinyl acetate to regenerated cellulose employing a diisocyanate.

Ten parts of partially hydrolyzed polyvinyl acetate (containing 20% free hydroxyl groups), 1 part paraffin wax and 1 part of hexamethylene diisocyanate in 100 parts dry dioxan were coated on regenerated cellulose film and dried at 100° C. The coating exhibited better adhesion and anchorage than a similar coating from which the diisocyanate was omitted.

*Example IX*

This example illustrates the improved adhesion of alkyd resins for wood when employing a diisocyanate.

A coconut oil modified alkyd resin having the composition: 60% glyceryl phthalate, 40% coconut oil, prepared using 2% excess glycerol, was applied on maple blocks and allowed to dry and then coated over with hexamethylene diisocyanate containing 0.2% cobalt napthenate as catalyst. The diisocyanate penetrated the resin coating, some reaching the wood below. The blocks so treated were then heated together, with their treated surfaces in contact, under pressure to 75° C. for ½ hour after which they were allowed to stand for 2 days at room temperature without any pressure being applied. After this time the breaking strength was 285 lbs./sq. in. A control prepared under similar conditions but without the diisocyanate had a breaking strength of 120 lbs./sq. in. The improved adhesion obtained by this process is of value in the formulation of plywood using alkyd resins and diisocyanates as bonding agents.

*Example X*

This example illustrates the use of a diisocyanate for bonding nylon to leather via a thin film of polyvinyl butyral.

A thin coat of a solution of 10% polyvinyl butyral (containing free hydroxyl groups) and 1% dibutyl phthalate in ethyl alcohol was applied to strips of sole leather (on the rough side) and also over the nylon side of a nylon coated fabric. The nylon had previously been roughened with emery cloth before the application of the above solution. The polyvinyl butyral surfaces were then treated with a 20% solution of hexamethylene diisocyanate in dry xylene, some diisocyanate penetrating to the leather and nylon below. The nylon coated and leather coated pieces were then clamped together (the butyral-treated sides touching) and placed in a 75° C. oven for ½ hour. The bond thus obtained was so strong that on attempting to pull the lamination apart it did not fail at the bond but the leather pulled apart. A control prepared in exactly the same manner but without the hexamethylene diisocyanate failed at the bond.

*Example XI*

This example illustrates the use of a diisocyanate-modified partially hydrolyzed polyvinyl acetate resin as an adhesive in the preparation of laminated wood.

Thin maple strips were coated with a 10% solution of 78% hydrolyzed polyvinyl acetate in alcohol, the solution allowed to evaporate and the coated portion then coated with a 20% solution of hexamethylene diisocyanate in dry toluene, some diisocyanate striking through to the wood. The strips were then laminated at 120° C. for 10 minutes at 100 lbs./sq. in. pressure. Testing of strips prepared in the above manner by suspending them under a shearing stress of 5 lbs./sq. in. in an oven or in water, raising the temperature and noting the temperature at which the lamination failed, showed that the diisocyanate treatment raised the temperature at which the lamination failed.

| Hexamethylene Diisocyanate treatment | Temperature at Failure | |
|---|---|---|
| | In oven | In Water |
| | °F. | °F. |
| No | 300 | 128 |
| Yes | 350 | 183 |

A 94% hydrolyzed polyvinyl acetate, which normally cannot be used as an adhesive because it will not give good laminations, gives an excellent bond when modified with a diisocyanate. Improved adhesion for wood is likewise obtained using a diisocyanate in conjunction with polyvinyl acetals or polyvinyl ketals, e. g., such as can be prepared from polyvinyl alcohol. In addition to the decrease in thermoplasticity and increase in water resistance indicated by the tests carried out as described above, all laminations involving the use of diisocyanate are characterized by improved strength both dry and wet.

*Example XII*

This example illustrates the binding together of polyester-amides with cellulose acetate and with leather using a diisocyanate.

A low molecular weight polyester-amide was made by heating a mixture containing 195.5 parts of ethylene glycol, 109.9 parts of ethanolamine, 723.1 parts of adipic acid and 100 parts of water for two hours at 170° C./8 mm. followed by 6 hours at 170° C./2 mm. Eight hundred and forty (840) parts of the homogenized mixture (acid number 29.8) was mixed with 42 parts of hexamethylene diisocyanate and 2 parts of cobalt naphthenate and heated for a period just long enough to get the reaction started. At this point, two separate portions of the mixture were treated as follows:

(a) One portion containing 300 parts of the mixture was dissolved in 454 parts of chloroform and then mixed in a Werner and Pfleiderer mixer with 200 parts of cellulose acetate which had been swollen in 800 parts of acetone. The solvents soon evaporated and the homogenized mixture was heated at 200° C. with mixing for approximately one hour. The product thus obtained was a tough, high molecular weight polymer which could be milled or plate pressed into strong, smooth sheets.

(b) The second portion likewise containing 300 parts of the mixture was dissolved in 454 parts of chloroform and then mixed in a Werner and Pfleiderer mixer with 200 parts of leather scrap which had been soaked in 454 parts of chloroform. The solvent soon evaporated leaving a homogeneous mixture which was cured at 200° C. over a period of approximately one hour. The final product was a tough, elastic mass which could be milled into thin sheets on a rubber mill. These sheets were plate pressed to smooth, tough films resembling leather.

*Example XIII*

This example illustrates the binding of polyesteramides to polyvinyl alcohol using hexamethylene diisocyanate.

A mixture containing 195.5 parts of ethylene glycol, 109.9 parts of ethanolamine, 723.1 parts of adipic acid and 100 parts of water was heated for two hours at 170° C. at atmospheric pressure followed by six hours at 200° C. under 2 mm. The product at this stage was a soft, fluorescent wax-like solid having an acid number of 10.4. Seven hundred parts of this was mixed with 35 parts of hexamethylene diisocyanate and reacted at 200° C. in a Werner and Pfleiderer mixer for about 30 minutes. At this stage 140 parts of polyvinyl alcohol was added and the reaction was continued for an additional hour at 200° C. or until the product became quite tough.

*Example XIV*

This example illustrates the effect of a diisocyanate on a mixture of urea-formaldehyde resin and alkyd resin.

A urea-formaldehyde resin, prepared from dimethylol-urea and isobutanol (2.5 parts) and a castor oil modified alkyd resin (1.75 parts) were dissolved in 5 parts of dioxan. To the resulting solution was added 1.5 parts of a 20% solution of hexamethylene diisocyanate in xylene and 0.05 part of a 10% solution of benzoyl peroxide in toluene. Films of this solution were flowed on metal plates and baked for ½ hour at 127° C. after which they were hard and tough. A film similar to the above but without the hexamethylene diisocyanate was inferior with respect to toughness and hardness.

*Example XV*

This example illustrates the effect of a diisocyanate on a mixture of cellulose nitrate and an oil modified alkyd resin.

Cellulose nitrate (2.9 parts) was dissolved in 15 parts of dry butyl acetate. To 5 parts of this solution was added 7.3 parts of an alkyd resin containing coconut oil, diethylene glycol phthalate, and glycerol phthalate. After solution was effected, 5 parts of a 20% solution of hexamethylene diisocyanate in xylene and 0.4 part of a 10% solution of benzoyl peroxide in toluene was added. Films of this solution were flowed on metal plates and baked at 100° C. for one-half hour. The film obtained was hard, tough and insoluble in butyl acetate whereas a control prepared under similar conditions but without the hexamethylene diisocyanate was soft and readily soluble in butyl acetate.

In the process of this invention, there may be used to link together the plurality of dissimilar polymeric materials having a plurality of active hydrogens any organic compound having a plurality of —X=C=Y groups, wherein X is —C or N and Y is O, S or NR, where R is hydrogen or a monovalent hydrocarbon radical. The compounds having a plurality of —X=C=Y groups include the polyisocyanates, the polyisothiocyanates, the polyketenes, the polythioketenes, the polygetenimines, and the polycarbodiimides, i. e., organic compounds having a plurality of —X=C=Y groups selected from the class consisting of the isocyanate, isothiocyanate, ketene, thioketene, ketenimine and carbodiimide groups including not only those compounds, all the —X=C=Y groups of which are the same but also those compounds wherein there is more than one type of —X=C=Y group.

The preferred compounds are those having a plurality of —N=C=Z groups wherein Z is a chalcogen of atomic weight below 33. These are preferred because of their greater availability, lesser cost, greater ease of preparation and because of their reactivity.

Exemplary —X=C=Y compounds include polymethylene diisocyanates and diisothiocyanates such as ethylene diisocyanate, trimethylene diisocyanate, dodecamethylene diisocyanate, hexamethylene diisocyanate, tetramethylene diisocyanate, pentamethylene diisocyanate, and the corresponding diisothiocyanates; alkylene diisocyanates and diisothiocyanates such as propylene-1,2-diisocyanate, 2,3-dimethyltetramethylene diisocyanate and diisothiocyanate, butylene-1,2-diisocyanate, butylene-1,3-diisothiocyanate, and butylene-1,3-diisocyanate; alkylidene diisocyanates and diisothiocyanates such as ethylidene diisocyanate $(CH_3CH(NCO)_2)$ and heptylidene diisothiocyanate $(CH_3(CH_2)_5CH(CNS)_2)$; cycloalkylene diisocyanates and diisothiocyanates such as 1,4-diisocyanatocyclohexane, cyclopentylene-1,3-diisocyanate, and cyclohexylene-1,2-diisothiocyanate; aromatic polyisocyanates and polyisothiocyanates such as m-phenylene diisothiocyanate, p-phenylene diisocyanate, p-phenylene diisothiocyanate, 1-methyl-phenylene-2,4-diisocyanate, naphthylene-1,4-diisocyanate, o,o'-toluene diisocyanate, diphenyl-4,4'-diisothiocyanate and diisocyanate, benzene-1,2,4 triisothiocyanate, 5-nitro-1,3-phenylene diisocyanate, xylylene-1,4 diisocyanate, xylylene-1,3 diisocyanate, 4,4'-diphenylenemethane diisocyanate, 4,4'-diphenylenepropane diisocyanate and xylylene-1,4 diisothiocyanate; aliphatic-aromatic diisocyanates and diisothiocyanates such as phenylethylene diisocyanate (C₆H₅CH(NCO)CH₂NCO); diisocyanates and diisothiocyanates containing heteroatoms such as SCNCH₂OCH₂NSC,

SCNCH₂CH₂OCH₂CH₂NSC and SCN(CH₂)₃—S—(CH₂)₃NSC; 1,2,3,4-tetraisocyanatobutane, butane-1,2,2 triisocyanate, 1-isocyanato, 4-isothiocyanatohexane, and 2-chloro-1,3-diisocyanatopropane.

The preferred diisocyanates, diisothiocyanates and mixed isocyanate-isothiocyanates have the general formula ZCN—R—NCZ in which R is a divalent hydrocarbon radical and Z is a chalcogen of atomic weight less than 33.

Examples of other types of —X=C=Y compounds which may be used include carbon suboxide C₃O₂, carbon subsulfide C₃S₂, diethylenediketene

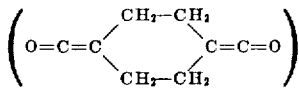

and compounds of formulae:

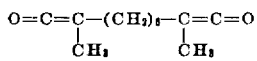

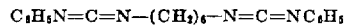

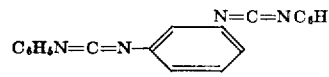

and

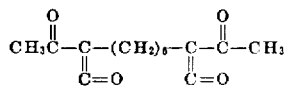

In the practice of the present invention, the poly—X=C=Y compound is reacted with a plurality of polymeric materials having active hydrogen containing groups. The presence of active hydrogen containing groups is determinable by means of the Zerewitinoff test. ("Analyse und Konstitutionsermittlung Organischen Verbindunger," by Hans Meyer, Fünfte Auflage, pages 371–375.) These materials contain groups such as —OH, —NH₂, —NRH, —COOH, —SH or groups which react similarly under the reaction conditions. Among the polymeric materials that may be bonded together by using one or more of the poly—X=C=Y compounds referred to above may be mentioned hydroxylated organic materials such as cellulose; starch; dextrin; wood; cellulose derivatives containing hydroxyl, amino or other active hydrogen-containing groups including among others cellulose esters such as acetate, propionate, butyrate and nitrate; cellulose mixed esters; cellulose ethers such as methyl- or ethyl cellulose; carboxylated cellulose; and regenerated cellulose. Polyvinyl alcohol and polyvinyl alcohol derivatives such as partially hydrolyzed polyvinyl acetate or polyvinyl propionate; polyvinyl acetals; and polyvinyl ketals can be used. Polyhydric alcohol-polybasic acid condensation products (alkyd resins) with free hydroxyl or carboxyl groups, which resins may or may not be oil-modified, may also be used.

Resins resulting from the condensation of formaldehyde with such materials as phenols, amides (including ureas and sulfonamides), aldehydes, ketones, aromatic ethers, aromatic hydrocarbons, carbamates, and amines prepared by any of the methods known in the art may be employed. The original resin may contain variable proportions of formaldehyde condensed with one or a mixture of monomeric materials and can be low, medium, or high molecular weight.

Nitrogen-containing polymeric materials are especially useful, for example: Polyester-amides such as the condensation product of ethanolamine, adipic acid, and ethylene glycol, or the condensation product of hexamethylenediamine, adipic acid, and ethylene glycol, or, in general, polymers formed by condensing a polyamine, polybasic acid and polyhydric alcohol. Low or high molecular weight polyamides such as polyhexamethyleneadipamide, polydecamethyleneadipamide, 6-aminocaproic acid polymer, and the like may be used. Protein and protein-like materials such as gelatin, casein, zein and leather; gums such as copal, Congo, kauri, shellac and dammar; and polymerized or gelled drying oils of the linoxyn type are also suitable.

Ether resins, for example, those prepared by reacting organic polyhalides with polyhydric phenols as described in U. S. Patent 2,060,175, and polymeric derivatives of acrylic, methacrylic or fumaric acid may also be used as resinous materials to which a different resinous material may be bonded.

Active hydrogen-containing vulcanizable materials may be employed including aldehyde treated natural and synthetic rubbers, for example, those disclosed in U. S. Patents 1,915,808 and 1,640,363 and British Patent 486,878, rubber di(hydroxyphenyl), and hydroxylated rubbers, e. g., the peracetylated rubbers and hydrolyzed peracetylated rubbers described in U. S. Patent 1,988,448. The term "rubber" unless otherwise modified, is used in its generic sense to include natural rubber, balata, gutta percha, modified rubber, neoprene, and the various butadiene and substituted butadiene polymers and interpolymers.

In the practice of this invention, any combination of two or more different polymeric materials containing active hydrogens may be used. The materials referred to above are given only by way of example.

It is not always necessary that the poly—X=C=Y compound be homogeneously mixed with one or more of the polymeric materials being bonded. Thus, in some instances (e. g., Examples IX–XI) the desired effect can be obtained by coating the surface of one polymeric material with another polymeric material and then spraying or otherwise treating the coating with the poly—X=C=Y compound or a solution thereof, the solubility of the —X=C=Y compound in the coating being sufficient to permit some of the —X=C=Y compound to strike through to the surface of the polymeric material below the coating.

The quantity of the poly—X=C=Y compound used depends upon the system of polymeric materials with which it is to be used. In some cases, the surface of one of the polymeric materials is simply coated or sprayed with the poly—X=C=Y compound alone or with a solution thereof in an inert solvent, and the other polymeric material applied and the two heated under pressure. In the cases where the poly—X=C=Y compound is reacted with a mixture of two or more polymeric materials, the proportion of the poly—X=C=Y compound may be varied widely. In most cases, however, the preferred amount of reagent will range from 0.5 to 15% of the weight of the polymeric materials.

The temperature used in the process of this invention depends upon the reactivity of the —X=C=Y compound towards the polymeric materials. In many cases reaction can be brought about at room temperature. In most cases, however, temperatures of 75–200° C. are used to greatest advantage. When the process is used to laminate two or more articles, e. g., sheets, it is desirable to use heat and pressure.

As indicated in Examples IX and XII above, the reaction between the poly—X=C=Y compound and the plurality of different, active hydrogen containing polymeric substances may be carried out with the assistance of catalysts, for example, the metallic catalysts known as "metallic driers" in the drying oil art, e. g., cobalt, manganese, lead, iron, vanadium, copper, cerium, chromium, uranium, nickel and tin salts of high molecular weight organic acids, such as oleic, stearic, lineoleic, myristic and other long chain fatty acids, naphthenic, and other alicyclic acids. The amount of metallic drier used is from 0.001 to 5%, preferably from 0.01 to 1.0%, based on the weight of the —X=C=Y compound.

When one of the polymeric materials to be treated is in the form of films, yarns, cords, fabrics or other base materials, the process is conveniently carried out by immersing the base material in a solution containing one or more other polymeric materials and the poly—X=C=Y compound or compounds, regulating the quantity of solution adhering to the base material by means of squeeze rolls, scrapers, or other suitable devices, or by merely allowing the excess to drain off followed by solvent removal either spontaneously or at elevated temperatures. In some cases, it may be preferable to apply separately the polymeric material or materials and the poly—X=C=Y compound. For example, one polymeric structure may first be treated with another polymeric material, dried to remove the solvent, and then treated with the poly—X=C=Y compound from solution or in vapor or gaseous form. Treatment of one of the polymeric materials with the poly—X=C=Y compound first and and then with the other polymeric material is also a method of carrying out the invention.

The present invention is of value in that it affords a means whereby a plurality of different, separately obtained polymeric materials can be bonded together or combined in such a manner that the bond between the materials is stronger than has hitherto been possible to obtain with the same materials. While we do not wish to be bound by our explanation for this result, we believe that the polymeric materials are chemically linked (cross-linked) by means of the poly—X=C=Y compound. Reference to the process as a means for uniting a plurality of different polymeric materials is intended to cover the process whether the "uniting" is chemical, physical or partly chemical and partly physical.

The invention is useful in the preparation of laminated articles from wood, paper, cloth, synthetic resins and the like. It is useful for coating preformed polymeric materials such as films, fabrics, cords, etc. with other polymeric products in order to obtain improved adhesion and durability. The process is also useful in bonding together an intimate mixture of two or more different polymeric materials before they are fabricated into articles.

In the specification and claims the term "polymeric material" is used in its usual sense as applying to products which contain a plurality of identical or closely related structural units and which can be formed from or degraded into compounds having the same or almost the same chemical composition as the structural units in the polymer. As contrasted with monomeric materials, polymeric materials have a high molecular weight.

The expression "different and separately obtained" as applied to the polymeric materials is used to indicate that the polymers have a different chemical composition, rather than a mere difference in molecular weight, and that they are separately formed. Thus ethyl cellulose as ordinarily prepared is not considered to constitute "different and separately obtained" polymeric materials even though some of the molecules of the ethyl cellulose may contain more ethyl groups than others and all molecules do not acquire their ethyl groups simultaneously in the ethylation reaction.

The products of this invention will be referred to as "reaction products" of the reactants employed but this term is not intended to be limited to products in which all the reactants, i. e., the poly—X=C=Y compound or compounds and the different and separately prepared polymeric materials are all chemically united into a single molecular aggregate or species.

The above description and examples are intended to be illustrative only. Any modification of or variation therefrom which conforms to the spirit of the invention is intended to be included within the scope of the claims.

What is claimed is:

1. A reaction product of a plurality of different and separately formed, active hydrogen-containing polymeric materials, with an organic compound having as the sole reacting groups a plurality of —X=C=Y groups, wherein X is selected from the class consisting of —C and N, and Y is selected from the class consisting of O, S and NR, where R is selected from the class consisting of hydrogen and monovalent hydrocarbon radicals.

2. A reaction product of a plurality of different and separately formed, active hydrogen-containing polymeric materials with an organic compound having as the sole reacting groups a plurality of —N=C=Z groups, wherein Z is a chalcogen of atomic weight below 33.

3. A reaction product of a plurality of different and separately formed, active hydrogen-containing polymeric materials with an organic polyisocyanate wherein the isocyanate groups are the sole reacting groups.

4. A reaction product of a plurality of different and separately formed, active hydrogen-containing polymeric materials with an organic diisocyanate wherein the isocyanate groups are the sole reacting groups.

5. A reaction product of a plurality of different and separately formed, active hydrogen-containing polymeric materials with hexamethylene diisocyanate.

6. A reaction product of a plurality of different and separately formed, hydroxyl-containing polymeric materials with an organic compound having as the sole reacting groups a plurality of —N=C=Z groups, wherein Z is a chalcogen of atomic weight below 33.

7. Process for uniting a plurality of different and separately formed polymeric materials containing active hydrogen, which comprises reacting the same with an organic compound having as the sole reacting groups a plurality of —X=C=Y groups, wherein X is selected from the class consisting of —C and N, and Y is selected from the class consisting of O, S, and NR, wherein R is selected from the class consisting of hydrogen and monovalent hydrocarbon radicals.

8. Process for uniting a plurality of different and separately formed polymeric materials containing active hydrogen which comprises reacting the same with an organic compound having as the sole reacting groups a plurality of —N=C=Z groups, wherein Z is a chalcogen of atomic weight less than 33.

9. Process for uniting a plurality of different and separately formed polymeric materials containing active hydrogen which comprises reacting the same with an organic polyisocyanate wherein the isocyanate groups are the sole reacting groups.

10. Process for uniting a plurality of different and separately formed polymeric materials containing active hydrogen which comprises reacting the same with an organic diisocyanate wherein the isocyanate groups are the sole reacting groups.

11. Process for uniting a plurality of different and separately formed polymeric materials containing active hydrogen which comprises reacting the same with hexamethylene diisocyanate.

12. Process for uniting an active-hydrogen containing polymeric material to the surface of an article of a different active-hydrogen containing polymeric material, which comprises bringing the two polymeric materials together in the presence of an organic compound having as the sole reacting groups a plurality of —X=C=Y groups, wherein X is selected from the class consisting of —C and N, and Y is selected from the class consisting of O, S, and NR, wherein R is selected from the class consisting of hydrogen and monovalent hydrocarbon radicals.

13. Process for uniting an active-hydrogen containing polymeric material to the surface of an article containing a different active-hydrogen containing polymeric material, which comprises coating said surface with an organic compound having as the sole reacting groups a plurality of —N=C=Z groups, wherein Z is a chalcogen of atomic weight less than 33 and then applying to the coated surface said first mentioned polymeric material.

14. Process for uniting an active-hydrogen containing polymeric material to the surface of an article of a different active-hydrogen containing polymeric material, which comprises incorporating in said first mentioned polymeric material an organic compound having as the sole reacting groups a plurality of —N=C=Z groups, wherein Z is a chalcogen of atomic weight less than 33, applying the resulting composition to the surface of said article, and heating the composition while in contact with said article.

BURT CARLTON PRATT.
HENRY SHIRLEY ROTHROCK.

REFERENCES CITED

The following references are of record in the file of this patent:

UNITED STATES PATENTS

| Number | Name | Date |
|---|---|---|
| 2,046,378 | Haux | July 7, 1938 |
| 2,047,226 | Rigby | July 14, 1936 |
| 2,241,321 | Schlack | May 6, 1941 |
| 2,284,896 | Hanford | June 2, 1942 |
| 2,282,827 | Rothrock | May 12, 1942 |

---

Certificate of Correction

Patent No. 2,430,479.  November 11, 1947.

BURT CARLTON PRATT ET AL.

It is hereby certified that errors appear in the printed specification of the above numbered patent requiring correction as follows: Column 3, line 21, for "unitl" read *until*; column 6, line 58, in the table, second column thereof, for "350" read *350+*; column 8, line 31, for "polygetenimines" read *polyketenimines*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.* acting the same with an organic compound having as the sole reacting groups a plurality of —X=C=Y groups, wherein X is selected from the class consisting of —C and N, and Y is selected from the class consisting of O, S, and NR, wherein R is selected from the class consisting of hydrogen and monovalent hydrocarbon radicals.

8. Process for uniting a plurality of different and separately formed polymeric materials containing active hydrogen which comprises reacting the same with an organic compound having as the sole reacting groups a plurality of —N=C=Z groups, wherein Z is a chalcogen of atomic weight less than 33.

9. Process for uniting a plurality of different and separately formed polymeric materials containing active hydrogen which comprises reacting the same with an organic polyisocyanate wherein the isocyanate groups are the sole reacting groups.

10. Process for uniting a plurality of different and separately formed polymeric materials containing active hydrogen which comprises reacting the same with an organic diisocyanate wherein the isocyanate groups are the sole reacting groups.

11. Process for uniting a plurality of different and separately formed polymeric materials containing active hydrogen which comprises reacting the same with hexamethylene diisocyanate.

12. Process for uniting an active-hydrogen containing polymeric material to the surface of an article of a different active-hydrogen containing polymeric material, which comprises bringing the two polymeric materials together in the presence of an organic compound having as the sole reacting groups a plurality of —X=C=Y groups, wherein X is selected from the class consisting of —C and N, and Y is selected from the class consisting of O, S, and NR, wherein R is selected from the class consisting of hydrogen and monovalent hydrocarbon radicals.

13. Process for uniting an active-hydrogen containing polymeric material to the surface of an article containing a different active-hydrogen containing polymeric material, which comprises coating said surface with an organic compound having as the sole reacting groups a plurality of —N=C=Z groups, wherein Z is a chalcogen of atomic weight less than 33 and then applying to the coated surface said first mentioned polymeric material.

14. Process for uniting an active-hydrogen containing polymeric material to the surface of an article of a different active-hydrogen containing polymeric material, which comprises incorporating in said first mentioned polymeric material an organic compound having as the sole reacting groups a plurality of —N=C=Z groups, wherein Z is a chalcogen of atomic weight less than 33, applying the resulting composition to the surface of said article, and heating the composition while in contact with said article.

BURT CARLTON PRATT.
HENRY SHIRLEY ROTHROCK.

REFERENCES CITED

The following references are of record in the file of this patent:

UNITED STATES PATENTS

| Number | Name | Date |
|---|---|---|
| 2,046,378 | Haux | July 7, 1938 |
| 2,047,226 | Rigby | July 14, 1936 |
| 2,241,321 | Schlack | May 6, 1941 |
| 2,284,896 | Hanford | June 2, 1942 |
| 2,282,827 | Rothrock | May 12, 1942 |

---

Certificate of Correction

Patent No. 2,430,479.  November 11, 1947.

BURT CARLTON PRATT ET AL.

It is hereby certified that errors appear in the printed specification of the above numbered patent requiring correction as follows: Column 3, line 21, for "unitl" read *until*; column 6, line 58, in the table, second column thereof, for "350" read *350+*; column 8, line 31, for "polygetenimines" read *polyketenimines*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*